Oct. 16, 1923.

C. T. TUNNICLIFFE 1,470,702

WASHING MACHINE

Original Filed Jan. 17, 1921

SECTION a-b

Inventor
Chas. T. Tunnicliffe
per John Barber Waite
Attorney

Patented Oct. 16, 1923.

1,470,702

UNITED STATES PATENT OFFICE.

CHARLES T. TUNNICLIFFE, OF ANN ARBOR, MICHIGAN.

WASHING MACHINE.

Application filed January 17, 1921, Serial No. 437,930. Renewed August 31, 1923.

*To all whom it may concern:*

Be it known that I, CHARLES T. TUNNICLIFFE, a citizen of the United States, residing at Ann Arbor, Washtenaw County, Michigan, have invented a new and useful Improvement in Washing Machines, of which the following is a full specification.

My invention relates particularly to that part of a washing machine whereby the dolly, or other rotor part, is caused to rotate in one direction for a definite period and then to reverse and rotate in the opposite direction for a like period.

Figure 1:
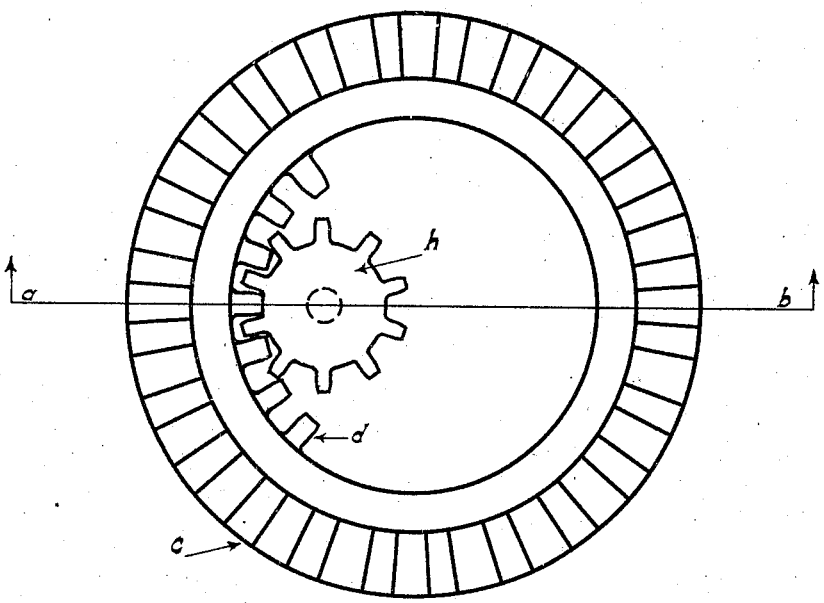
Figure 2:
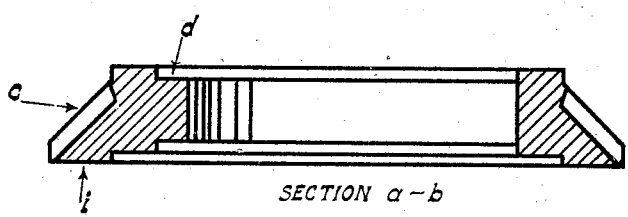
Figure 3:
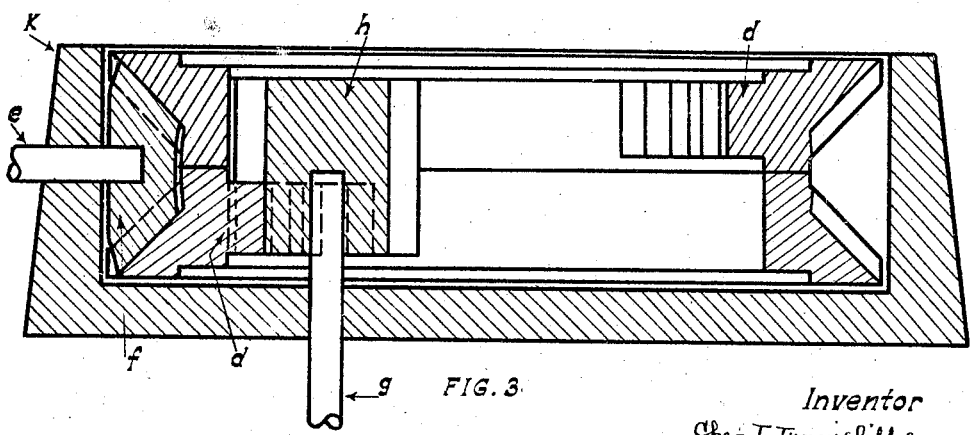

Referring to the drawing which forms part of this application, Figure 1 is a plan view of one of the gear wheels used in my invention. Figure 2 is a cross section of the same wheel along the line $a$—$b$, of Figure 1. Figure 3 is a sectional view of the invention with its various parts assembled.

My device consists of two annular gear wheels, of which Fig. 1 is a plan view of one of them, and Fig. 2 is a cross section along the line $a$—$b$, Fig. 1. These wheels, as I use them, are approximately 7 inches in outside diameter and 5 inches inside diameter, are ¾ inch in height and are made of bronze, although neither the size nor the material are essential in my invention. The outside of each wheel is cut so as to form a bevel gear, indicated by $c$ in the drawings, at the proper angle to mesh with a driving pinion, $f$, Fig. 3, whose axis of rotation is parallel to the plane of the wheel. On the inside of each wheel is a segment of gear teeth, $d$, Figs. 1, 2, so cut as to mesh with a pinion, $h$, Fig. 3, whose axis of rotation is vertical to the plane of the wheel.

These two wheels I superimpose one on the other, concentrically, with the bevel gears of one facing toward those of the other. These wheels I then place in a box, $k$, Fig. 3, preferably of bronze or other good bearing metal, of a depth slightly greater than that of the two wheels and of such a diameter as will hold the two wheels in concentric position without being tight enough to prevent their rotating freely. The bottom of the lower wheel, $i$, rests upon the flat surface of the bottom of the box, which thereby furnishes a bearing for the rotation of the wheel.

Into the box, through a hole in its side, projects a shaft, $e$, Fig. 3, carrying a bevel geared pinion, $f$, Fig. 3, of such size and shape as to mesh with the bevel gears of the two wheels. When this shaft and its pinion are rotated by any means the two gear wheels are thereby caused to rotate in opposite directions. The bottom of the box serves as a bearing for the lower wheel and that wheel is itself a bearing for the upper wheel. I have described the apparatus as though placed in a position with the planes of the wheels horizontal. I do not confine myself to such position, however. If a cover be bolted to the box, the wheels will be surrounded with bearing surfaces and the apparatus may be operated in any position.

Projecting through the bottom of the box is a shaft, $g$, which carries a pinion, $h$, so geared as to mesh with the segments of gears, $d$, on the inner side of the wheels. The other end of this shaft is attached to the dolly or other rotating part of the washing machine. This pinion is of such length that it can mesh with the gears on either or both of the wheels.

Since these gear wheels are caused to rotate in opposite directions by the pinion $f$, it is obvious that if the pinion $h$ were meshed with both wheels at the same time the device would be locked. The segmental gears therefore occupy only an arc of the inner circumference of each wheel. The arc which they cover should be of such a length—depending upon the relative size of the gear wheels and the pinion—as to allow the wheels to be adjusted so that when the device is put in motion the first tooth of the segmental gear of one wheel will enter the same mesh of the pinion that the last tooth of the segmental gear of the other wheel is leaving.

If this is done, while the pinion $h$ is in mesh with the segmental gear of one wheel it will be caused to rotate by that gear. As that gear leaves the mesh, the first tooth of the gear on the other wheel will enter the mesh and that gear will cause the pinion to revolve in the opposite direction. As this gear leaves the mesh the first one will again come into mesh, and thus the pinion will be caused continually to rotate first in one direction and then in the other.

If the first and last teeth of these segmental gears are of the same height or length, there will be a moment of time when neither of the segmental gears is actully in mesh with the pinion. This permits the pinion to turn independently of the movement of the gear wheels. If such motion occurs, it may happen that a tooth of the segmental gear and one on the pinion will meet directly, instead of meshing, in which case the rotation of the various parts would be abruptly stopped. I have discovered that this possibility can be obviated by making the last tooth of each segmental gear—that is, the last tooth to leave the pinion—slightly longer than the rest, say $\frac{9}{16}''$ to $\frac{8}{16}''$ for the other teeth. This added length holds the pinion in mesh with the gear which is leaving it until the first tooth of the approaching gear has safely entered that same mesh.

I do not claim any form of washing dolly or other rotor part of a washing machine, nor do I claim any special means for driving the gear wheels described, in opposite directions.

I claim:—

1. In a washing machine, a means of causing the rotor part to revolve alternately in opposite directions, consisting of two gear wheels having segmental gears on their inner periphery, a cylindrical box of metal surrounding said gear wheels and of such size as to hold said wheels in a concentric position and in juxtaposition to each other, substantially as described, and a shaft projecting through said box perpendicularly to the plane of said gear wheels and carrying on its end within said box a pinion arranged to be in mesh with the segmental gears alternately, all substantially as described.

2. In a washing machine, a means of causing the rotor part to revolve alternately in opposite directions, consisting of two gear wheels having segmental gears on their inner periphery, one tooth of each of said gears being slightly longer than the others, as described, a cylindrical box of metal surrounding said gear wheels and of such size as to hold said wheels in a concentric position and in juxtaposition to each other such as described and a shaft projecting through said box perpendicularly to the plane of said gear wheels and carrying on its end within said box a pinion arranged to be in mesh with the segmental gears alternately, all substantially as described.

CHARLES T. TUNNICLIFFE.